United States Patent
White et al.

(10) Patent No.: US 12,316,940 B2
(45) Date of Patent: May 27, 2025

(54) VEHICULAR CAMERA ASSEMBLY PROCESS USING LASER ETCHING FOR ACTIVE FOCUSING AFTER LENS IS SECURED RELATIVE TO IMAGER

(71) Applicant: Magna Electronics Inc., Auburn Hills, MI (US)

(72) Inventors: Jeffrey A. White, Howell, MI (US); Zhongyao Liu, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 216 days.

(21) Appl. No.: 17/663,450

(22) Filed: May 16, 2022

(65) Prior Publication Data

US 2022/0377213 A1    Nov. 24, 2022

Related U.S. Application Data

(60) Provisional application No. 63/201,920, filed on May 19, 2021.

(51) Int. Cl.
| | |
|---|---|
| *H04N 23/55* | (2023.01) |
| *H04N 17/00* | (2006.01) |
| *H04N 23/51* | (2023.01) |
| *H04N 23/54* | (2023.01) |
| *H04N 23/67* | (2023.01) |

(52) U.S. Cl.
CPC .......... *H04N 23/55* (2023.01); *H04N 17/002* (2013.01); *H04N 23/51* (2023.01); *H04N 23/54* (2023.01); *H04N 23/67* (2023.01)

(58) Field of Classification Search
CPC ........ H04N 23/55; H04N 23/51; H04N 23/67; H04N 23/54; H04N 17/002
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,480,149 B2 | 1/2009 | DeWard et al. |
| 7,720,580 B2 | 5/2010 | Higgins-Luthman |

(Continued)

FOREIGN PATENT DOCUMENTS

JP     2003266553 A   *  9/2003

*Primary Examiner* — Thai Q Tran
*Assistant Examiner* — Jose M Mesa
(74) *Attorney, Agent, or Firm* — HONIGMAN LLP

(57) ABSTRACT

A vehicular camera system includes a vehicular camera including a camera housing and an imager printed circuit board (imager PCB). The camera housing includes a first portion and a second portion joined with the first portion. The first portion includes a lens barrel accommodating a lens that includes a plurality of lens optics. The imager PCB includes an imager and is attached at the first portion of the camera housing with the imager aligned with the lens. With the imager aligned with the lens, the lens focuses an image at the imager. After the imager PCB is attached at the first portion of the camera housing with the imager aligned with the lens, at least one lens optic of the lens is laser processed to adjust the focus of the lens at the imager.

24 Claims, 4 Drawing Sheets

(56) References Cited

U.S. PATENT DOCUMENTS

| | | |
|---|---|---|
| 7,855,755 B2 | 12/2010 | Weller et al. |
| 7,965,336 B2 | 6/2011 | Bingle et al. |
| 8,256,821 B2 | 9/2012 | Lawlor et al. |
| 8,542,451 B2 | 9/2013 | Lu et al. |
| 9,233,641 B2 | 1/2016 | Sesti et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,264,219 B2 | 4/2019 | Mleczko et al. |
| 10,272,857 B2 | 4/2019 | Conger et al. |
| 10,313,597 B2 | 6/2019 | Mleczko |
| 10,652,437 B2 | 5/2020 | Becker et al. |
| 2005/0167862 A1 | 8/2005 | Sano |
| 2008/0030876 A1* | 2/2008 | Kataoka ............... B23K 26/032 |
| | | 425/106 |
| 2011/0042839 A1* | 2/2011 | Tanimura ........... G01M 11/0257 |
| | | 264/2.2 |
| 2013/0242099 A1 | 9/2013 | Sauer et al. |
| 2013/0258140 A1 | 10/2013 | Lipson et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2020/0010024 A1 | 1/2020 | Sesti et al. |
| 2020/0076994 A1* | 3/2020 | Kunze ....................... B60R 1/00 |
| 2021/0103119 A1* | 4/2021 | Reckker ................. H04N 23/55 |
| 2021/0382375 A1 | 12/2021 | Sesti et al. |
| 2022/0103723 A1 | 3/2022 | Skrocki et al. |

* cited by examiner

VEHICULAR CAMERA ASSEMBLY PROCESS USING LASER ETCHING FOR ACTIVE FOCUSING AFTER LENS IS SECURED RELATIVE TO IMAGER

CROSS REFERENCE TO RELATED APPLICATION

The present application claims the filing benefits of U.S. provisional application Ser. No. 63/201,920, filed May 19, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 10,652,437; 7,965,336; 5,949,331; 5,670,935 and/or 5,550,677, which are hereby incorporated herein by reference in their entireties.

SUMMARY OF THE INVENTION

A vehicular camera for a driver assistance system or vision system or imaging system for a vehicle utilizes one or more cameras to capture image data representative of images interior or exterior of the vehicle. The camera includes a lens holder and an imager printed circuit board (imager PCB), with the imager PCB affixed to the lens holder, and with a lens barrel (accommodating a lens or lens assembly therein) attached at the lens holder. The imager PCB (with the imager disposed thereat) is positioned at the lens holder and attached thereto, such as via fasteners or adhesive or the like. After the lens is aligned (by axially adjusting and/or radially adjusting and/or tilting the lens barrel relative to the lens holder to adjust the alignment of the lens relative to the imager) and fixed relative to the imager, the lens is focused relative to the imager via laser processing (such as etching or deforming) of at least one lens optic of the lens. That is, the at least one lens optic of the lens is laser processed to align a focus or imaging plane of the lens with an imager plane of the imager.

These and other objects, advantages, purposes and features of the present invention will become apparent upon review of the following specification in conjunction with the drawings.

DESCRIPTION OF THE PREFERRED EMBODIMENTS

Figure 1:
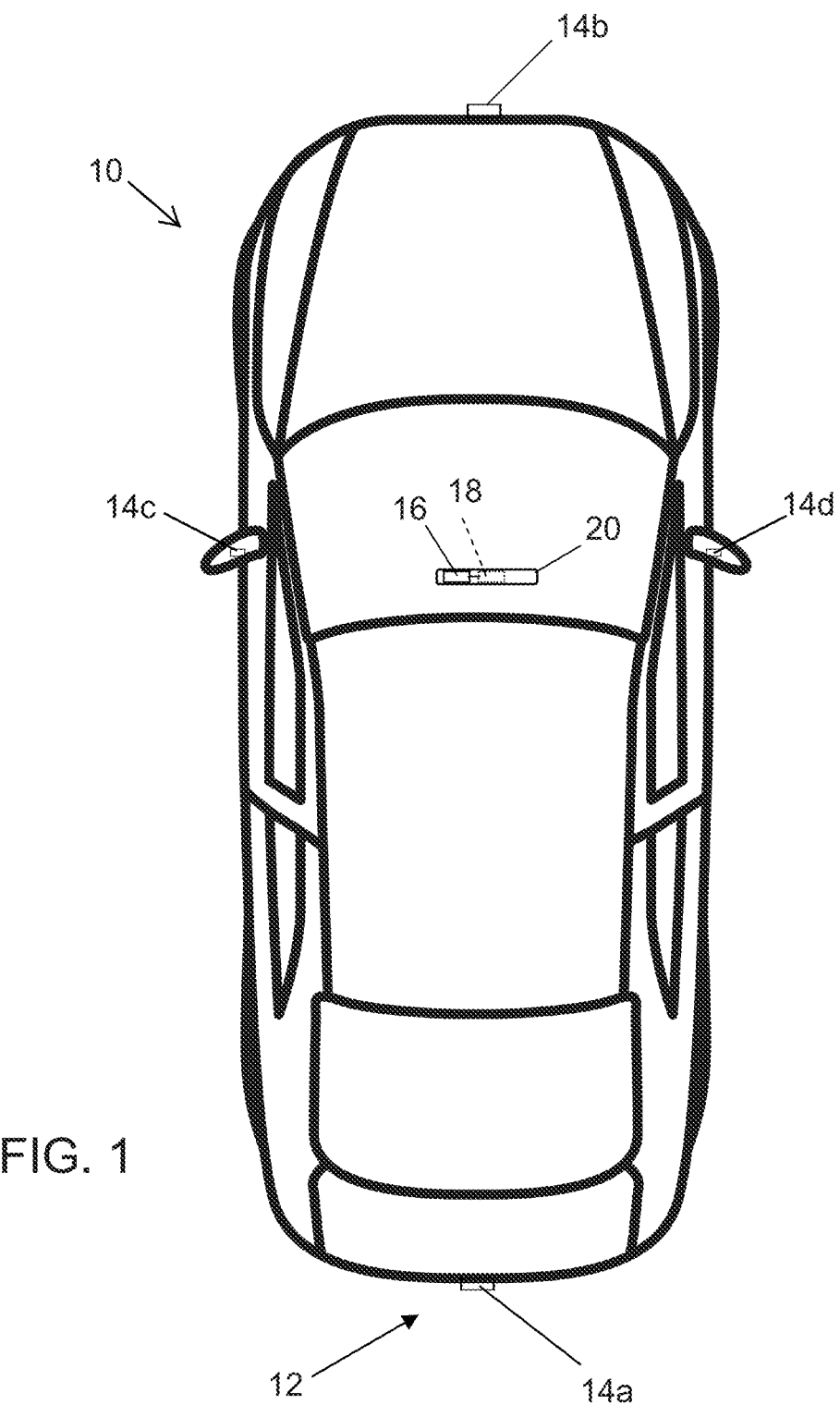
FIG. 1 is a plan view of a vehicle with a vision system that incorporates a plurality of cameras.
Figure 2:
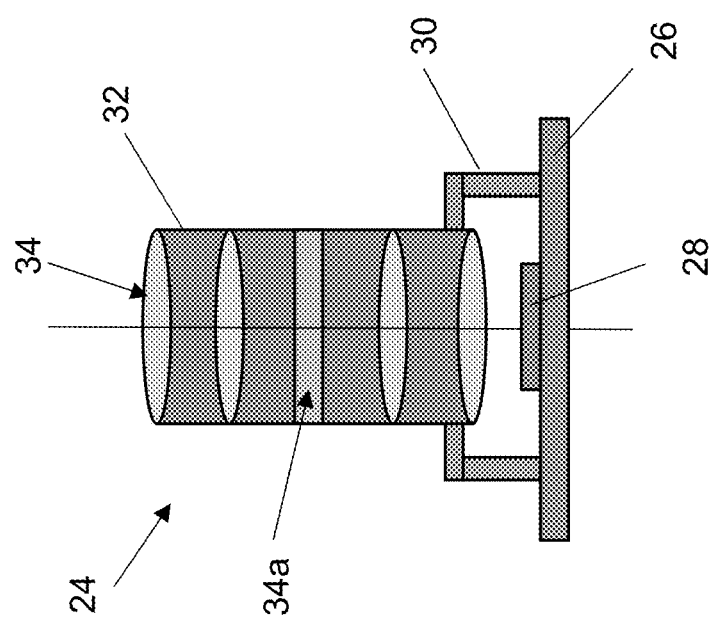
FIG. 2 is a sectional view of the camera, showing the imager printed circuit board attached at the lens holder or front camera housing, with the lens barrel disposed at an aperture of the front camera housing.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, one or more cameras may be disposed in the interior cabin of the vehicle, whereby image data captured by the interior camera(s) may be processed for a driver or occupant monitoring system. The vision system 12 includes a control or electronic control unit (ECU) 18 having electronic circuitry and associated software, with the electronic circuitry including a data processor or image processor that is operable to process image data captured by the camera or cameras, whereby the system, via processing of image data at the ECU, may detect or determine presence of objects or the like and/or the system may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, active focus and alignment is used to set and secure a focal position of a lens relative to an imager of the camera. However, this leads to expensive and complicated measures to manage the compliance tolerances created by the camera components and the manufacturing focus/alignment process. For example, a camera may be assembled using an active printed circuit board (PCB) alignment, which may use screws to secure the PCB to the lens holder or front camera housing. After the PCB is secured to the lens holder, the lens barrel (such as a threaded lens barrel) is threaded into the lens holder and used to set the focus of the lens relative to the imager of the PCB. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a pliable material (before it is cured) to allow for focus and alignment, which is achieved by moving the lens relative to the lens holder. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to fix the imager PCB relative to the lens holder set the focus, alignment, and rotation. The adhesive (that bonds the circuit board to the lens holder) acts as a pliable material (before it is cured) to allow for focus and alignment, which is achieved by moving the PCB relative to the lens holder. The UV and additional curing increases the tolerance stack of the finished assembly, and quick cure adhesives require UV curing and additional curing. This curing increases the tolerance stack of the finished assembly.

Referring now to FIGS. 2-6, a camera assembly process utilizes a rough or non-focused attachment of the lens barrel relative to the lens holder or front camera housing and relative to the imager printed circuit board (imager PCB) and imager. The lens barrel is received in the front portion of the camera housing and the front portion of the camera housing and/or lens barrel are fixed relative to the imager and imager PCB. A rear portion of the camera housing may be attached to or joined with the front portion of the camera housing after the imager PCB is attached to the front portion. After the lens barrel and lens holder are fixed relative to the imager, the lens is focused via laser processing (such as etching or deforming) of at least one lens optic of the lens or lens assembly accommodated in the lens barrel. The lens optic may comprise a suitable material (that is etchable or deformable via a laser or the like) and may be a generic (having a planar or slightly curved or non-optimally curved surface or surfaces) or nominal size/shape or slightly oversized, such that any laser etching or deforming reduces the size and/or adjusts the shape or surface curvature of the optic to provide the proper focus of the lens relative to the imager. The focus and optical alignment process may adjust the lens optic across the surface or only at parts of the surface and allows for any out of focus condition to be compensated for without mechanically adjusting the lens holder and lens barrel relative to the PCB. That is, a shape or surface of the lens optic is adjusted via laser etching to focus and align the lens and the imager on the imager PCB.

For example, the camera or imager assembly 24 comprises an imager printed circuit board 26 (imager PCB) with an imager 28 disposed at a side or surface thereof. The imager PCB 26 is attached at a lens holder 30 (e.g., the imager PCB may be adhesively bonded to the lens holder or screwed to the lens holder using one or more threaded fasteners), and a lens barrel 32 (that accommodates a lens 34 having a plurality of lens optics, including a laser etchable or laser deformable lens optic or element 34a) is disposed at an aperture of the lens holder 30. The imager assembly 24 is assembled and the lens barrel 32 is generally aligned with the imager 28 and affixed relative to the lens holder 30 (see FIG. 2). After the imager assembly 24 is assembled, the imager assembly 24 moves to a focus measuring step (FIGS. 3 and 5), where the focus (or defocus) of the lens 34 is determined and where the degree or pattern of laser etching/laser deforming is determined. The lens optic 34a (comprising a laser etchable or laser deformable material) is laser processed to adjust the surface curvature to move the focus plane or image plane of light that passes through the lens 34 so that it is at or aligned with the image plane of the imager 28. That is, when the lens is initially aligned with the imager, the lens focuses an image through the lens at the imager. The lens optic 34a of the lens is adjusted via laser processing to adjust the focus or focal plane of the lens at the imager. For example, a degree of focus of the image at the imager may be determined and the lens optic 34a may be laser processed based at least in part on the determined degree of focus to accommodate for any offset of the focal plane of the imaged light from the imaging plane of the imager. The lens may be determined to be focused when the image is aligned with an image plane of the imager.

Figure 4:
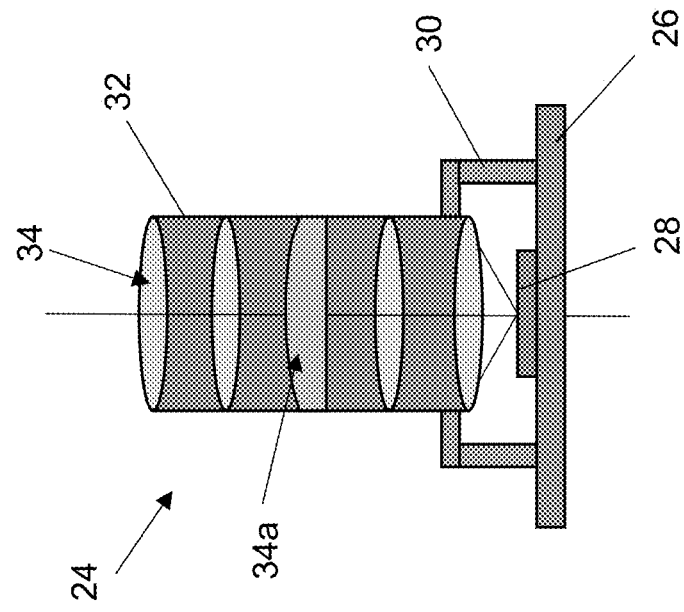
FIG. 4 is another sectional view of the camera of FIG. 3, showing a laser etched lens optic to focus the lens relative to the imager.
Figure 3:
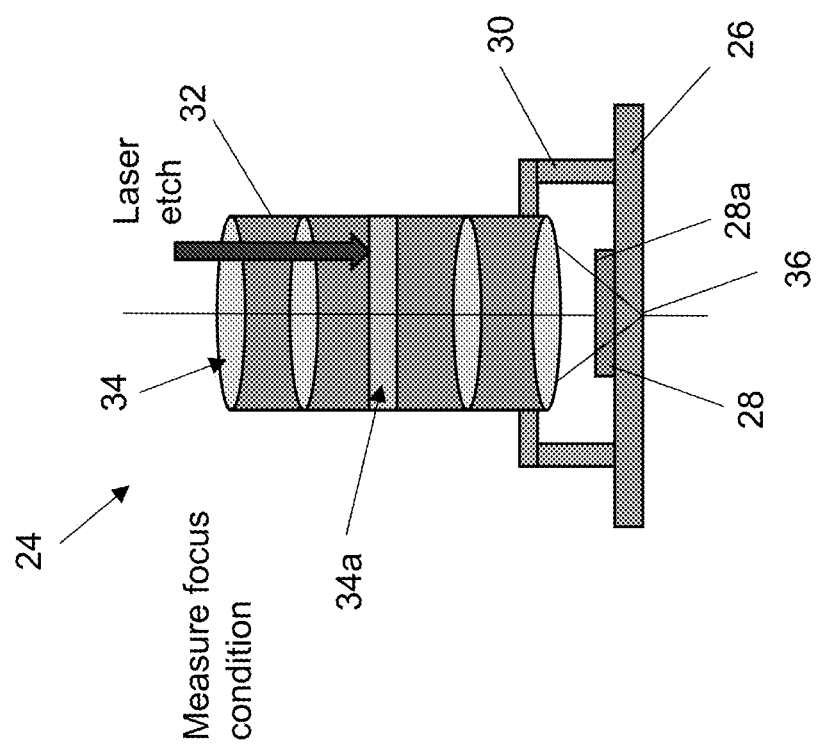
FIG. 3 is another sectional view of the camera, during a focus measurement process.
Figure 6:
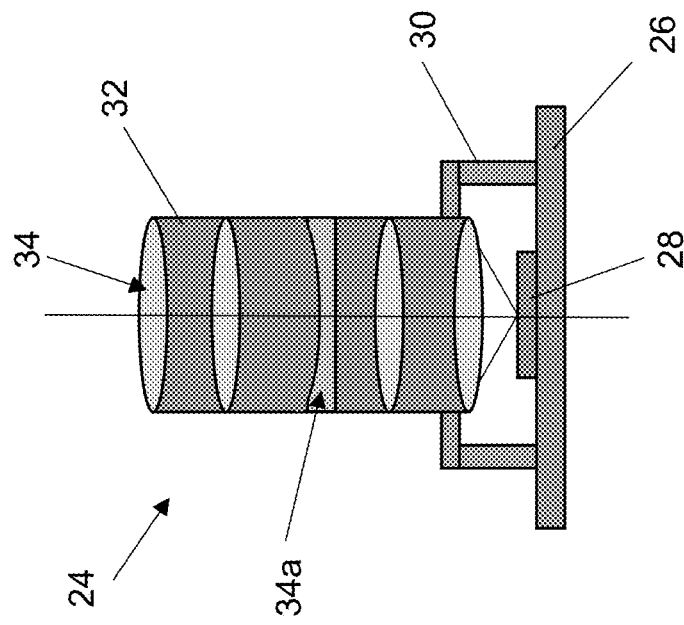
FIG. 6 is another sectional view of the camera of FIG. 5, showing a laser etched lens optic to focus the lens relative to the imager.
Figure 5:
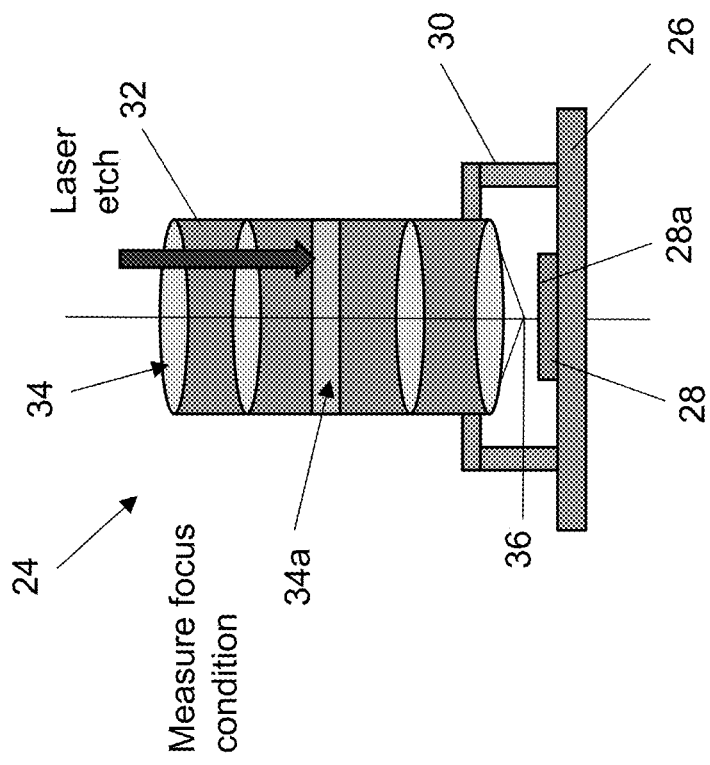
FIG. 5 is another sectional view of the camera, during a focus measurement process.

For example, FIG. 3 shows where the focus plane 36 of the lens 34 is beyond the image plane 28a of the imager 28 (i.e., the focus plane 36 of the lens 34 is further from the lens 34 than the image plane 28a of the imager 28), so the laser etching or laser deforming changes the curvature of the lens optic 34a to shorten the focal distance and to bring the focus plane 36 to the imager plane 28a (FIG. 4). For example, a surface or shape of the lens optic 34a may be made more convex to direct the focus plane 36 toward the image plane 28a. Optionally, for example, FIG. 5 shows where the focus plane 36 of the lens 34 is closer than the image plane 28a of the imager 28 (i.e., the focus plane 36 of the lens 34 is closer to the lens 34 than the image plane 28a), so the laser etching or laser deforming changes the curvature of the lens optic 34a to lengthen the focal distance and to bring the focus plane 28 to the image plane 28a (FIG. 6). For example, a surface or shape of the lens optic 34a may be made more concave to direct the focus plane 36 toward the image plane 28a.

Thus, the lens 34 may be roughly or simply or quickly aligned at the imager 28 and imager PCB 26 and glued or otherwise secured at the imager/PCB. The focus condition of the lens-imager is measured (such as via image processing of image data captured by the camera), and the degree of laser etching to obtain proper focus of the lens 34 relative to the imager 28 is determined. The lens optic 34a is then laser etched to adjust the lens focus to the proper focus relative to the imager 28. The camera lens 34 thus is adjusted using a simple focus input to create a map of how to adjust the curvature of one or more lens optics of the lens to bring it into focus. The process uses lasers to adjust focus after the lens is roughly aligned and attached, and thus may reduce parts and processing.

The lens 34 may include a specially designed lens element and lens stack that is designed to always be on one side of the focus curve. Based on the assembled focus state, the laser etches the lens element until the lens shifts into focus. The lens 34 is thus adjusted after it is attached and fixed relative to the imager 28, so instead of adjusting the imager 28 or lens 34 to align the imager 28 at the focus plane 36, the process adjusts the lens element 34a to adjust the focus plane 36 and align the focus plane 36 with the imager 28. The lens element 34a may comprise a laserable acrylic element (e.g., acrylic or polymethyl methacrylate (PMMA) or the like, which is optically clear and may be laser etchable or deformable) or other suitable material that can be laser etched or deformed or adjusted to adjust the focus of the lens 34 relative to the imager 28. The lens element 34a may be etched or deformed using the laser. By deforming the lens element 34a instead of etching and removing material, the process may avoid any issues with etched material or residue being in the lens barrel. For example, the laser may heat the lens element 34a and the lens element 34a may be compressed or stretched or otherwise manipulated to adjust the shape and thus focus of the lens. Forces may be applied to the lens element 34*a* within the lens barrel via grippers or other suitable manipulation tooling. In other words, etching the lens element 34*a* may remove lens material to adjust the shape and/or surface (and therefore focus) of the lens element and deforming the lens element 34*a* adjusts the shape and/or surface (and therefore focus) of the lens element without removing lens material.

The imager PCB 26 is housed or supported at a lens holder or front camera housing 30, such as via fasteners or adhesive or the like. The imager PCB 26 may include an electrical connector at its rear side (opposite the side at which the imager 28 is disposed) for electrically connecting to a connector portion of a rear housing or cover portion. Optionally, the camera may have two (or more) printed circuit boards, with the imager being disposed at the imager PCB and with the electrical connector disposed at a connector printed circuit board (connector PCB), and with circuitry of the printed circuit boards being electrically connected via a flexible ribbon cable or the like.

Thus, the imager PCB is attached to the front or upper housing by, such as by screws or adhesive or heat staking, and the lens barrel may be fixed at the lens holder so that it is generally aligned with the imager. The upper or front housing and the lower or rear housing may be laser welded together prior to the focus and alignment of the lens relative to the imager. After the camera is assembled, the degree of laser etching or deformation is determined and the laser etches or deforms the lens element accordingly to achieve proper focus of the lens relative to the imager.

Optionally, the degree of laser etching may be determined in real time, or in steps, as the laser etches or deforms the lens element and the focus plane of the lens moves into alignment with the image plane of the imager. In other words, the laser may partially deform or etch the lens element to move the focus plane toward alignment with the image plane of the imager, the partial focus of the lens may be determined (such as by further processing of image data captured by the camera) and then the laser may further deform or etch the lens element to move the focus plane further toward alignment with the image plane of the imager. Thus, determining the location of the focus plane relative to the image plane and laser processing the lens element may be an iterative process performed in several steps so that the lens may be gradually focused and aligned with the imager to avoid over etching or over deforming the optic element beyond alignment.

Thus, the camera and assembly process aligns the image plane of the imager to the lens focus or imaging plane, but instead of quick cure adhesive or other components, the focus or imaging plane is set after the camera is assembled. The process uses one or more lasers to fine tune the focus of the camera in the final assembled state. The process uses a material such as PMMA or acrylic as a lens element and etches or shapes the surface contour of the lens element to adjust the focus or image plane location after the camera is assembled. This allows the process or system to adjust for and to accommodate any assembly misalignment between the focus or imaging plane and the imager after the camera is assembled.

The camera may utilize aspects of the cameras described in U.S. Publication Nos. US-2022-0103723 and/or US-2021-0382375, which are hereby incorporated herein by reference in their entireties. Optionally, the lens barrel and front housing portion may be part of an imager assembly that is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. Optionally, the camera may comprise an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. The camera assembly includes an electrical connector portion that is configured to electrically connect to a vehicle wire harness when the camera is installed at a vehicle.

The camera may have a single printed circuit board (having the imager at one side and circuitry and connecting elements (such as a header connector) at the other side), or the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the imager and the housing portions are joined or bonded, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera system, the vehicular camera system comprising:
 a vehicular camera comprising a camera housing and an imager printed circuit board (imager PCB);
 wherein the camera housing comprises a first portion and a second portion joined with the first portion;
 wherein the first portion of the camera housing includes a lens barrel accommodating a lens comprising a plurality of lens optics;
 wherein the imager PCB comprises a first side and a second side opposite the first side and separated from the first side by a thickness of the imager PCB, and wherein an imager is disposed at the first side of the imager PCB, and wherein the imager PCB is attached at the first portion of the camera housing with the imager aligned with the lens;
 wherein, with the imager aligned with the lens, the lens focuses an image at the imager; and
 wherein, after the imager PCB is attached at the first portion of the camera housing with the imager aligned with the lens, at least one lens optic of the plurality of lens optics of the lens is laser processed to adjust the focus of the lens at the imager.

2. The vehicular camera system of claim 1, wherein the at least one lens optic of the plurality of lens optics of the lens is laser etched to adjust a surface curvature of the at least one lens optic.

3. The vehicular camera system of claim 1, wherein the at least one lens optic of the plurality of lens optics of the lens is laser deformed to adjust a surface curvature of the at least one lens optic.

4. The vehicular camera system of claim 1, wherein, with the imager aligned with the lens, a degree of focus of the image at the imager is determined and the at least one lens optic of the plurality of lens optics of the lens is laser processed at least in part based on the determined degree of focus of the image at the imager.

5. The vehicular camera system of claim 4, wherein the degree of focus of the image at the imager is determined via image processing of image data captured by the imager.

6. The vehicular camera system of claim 4, wherein the degree of focus of the image at the imager is determined iteratively as the at least one lens optic of the plurality of lens optics of the lens is laser processed.

7. The vehicular camera system of claim 4, wherein, after the at least one lens optic of the plurality of lens optics of the lens is laser processed, the lens is determined to be focused relative to the imager when the image aligns with an image plane of the imager.

8. The vehicular camera system of claim 1, wherein the first portion of the camera housing comprises an aperture therethrough, and wherein the lens barrel is positioned at the aperture of the first portion of the camera housing and aligned with the imager.

9. The vehicular camera system of claim 8, wherein, with the lens barrel positioned at the aperture and aligned with the imager, the lens barrel is fixedly attached at the first portion of the camera housing.

10. The vehicular camera system of claim 1, wherein the second portion of the camera housing is joined with the first portion after the imager PCB is attached to the first portion.

11. The vehicular camera system of claim 1, wherein the vehicular camera comprises an electrical connector portion configured to electrically connect to a wire harness of a vehicle equipped with the vehicular camera system.

12. A method for assembling a vehicular camera, the method comprising:
 providing a camera housing comprising a first portion and a second portion joined with the first portion;
 wherein the first portion of the camera housing includes a lens barrel accommodating a lens, the lens comprising a plurality of lens optics;
 providing an imager printed circuit board (imager PCB), wherein the imager PCB comprises a first side and a second side opposite the first side and separated from the first side by a thickness of the imager PCB, and wherein an imager is disposed at the first side of the imager PCB;
 attaching the imager PCB at the first portion of the camera housing with the imager aligned with the lens;
 with the imager aligned with the lens, determining a degree of focus of an image imaged by the lens at the imager; and
 responsive to the determined degree of focus, laser processing at least one lens optic of the plurality of lens optics of the lens to adjust the focus of the lens at the imager.

13. The method of claim 12, wherein laser processing the at least one lens optic of the plurality of lens optics of the lens comprises laser etching the at least one lens optic to adjust a surface curvature of the at least one lens optic.

14. The method of claim 12, wherein laser processing the at least one lens optic of the plurality of lens optics of the lens comprises laser deforming the at least one lens optic to adjust a surface curvature of the at least one lens optic.

15. The method of claim 12, wherein determining the degree of focus of the image imaged by the lens at the imager comprises image processing of image data captured by the imager.

16. The method of claim 12, wherein determining the degree of focus of the image imaged by the lens at the imager comprises iteratively determining the degree of focus of the image imaged by the lens at the imager while laser processing the at least one lens optic of the plurality of lens optics of the lens.

17. The method of claim 12, further comprising, after laser processing the at least one lens optic of the plurality of lens optics of the lens, determining that the lens is focused relative to the imager based on the image being aligned with an image plane of the imager.

18. The method of claim 12, wherein the second portion of the camera housing is joined with the first portion after the imager PCB is attached to the first portion.

19. The method of claim 12, wherein the first portion of the camera housing comprises an aperture therethrough, and wherein the method comprises positioning the lens barrel at the aperture of the first portion of the camera housing and aligned with the imager.

20. The method of claim 19, comprising, with the lens barrel positioned at the aperture and aligned with the imager, fixedly attaching the lens barrel at the first portion of the camera housing prior to determining the degree of focus of the image imaged by the lens at the imager.

21. A vehicular camera system, the vehicular camera system comprising:

a vehicular camera comprising a camera housing and an imager printed circuit board (imager PCB);

wherein the camera housing comprising a first portion and a second portion joined with the first portion;

wherein the first portion of the camera housing includes a lens barrel accommodating a lens comprising a plurality of lens optics;

wherein the imager PCB comprises a first side and a second side opposite the first side and separated from the first side by a thickness of the imager PCB, and wherein an imager is disposed at the first side of the imager PCB, and wherein the imager PCB is attached at the first portion of the camera housing with the imager aligned with the lens;

wherein, with the imager aligned with the lens, the lens focuses an image at the imager;

wherein, after the imager PCB is attached at the first portion of the camera housing with the imager aligned with the lens, a degree of focus of the image at the imager is determined;

wherein, based at least in part on the determined degree of focus of the image at the imager, at least one lens optic of the plurality of lens optics of the lens is laser processed to adjust the focus of the lens at the imager; and wherein the at least one lens optic of the plurality of lens optics of the lens is laser etched to adjust a surface curvature of the at least one lens optic.

22. The vehicular camera system of claim 21, wherein the degree of focus of the image at the imager is determined via image processing of image data captured by the imager.

23. The vehicular camera system of claim 21, wherein the degree of focus of the image at the imager is determined iteratively as the at least one lens optic of the plurality of lens optics of the lens is laser processed.

24. The vehicular camera system of claim 21, wherein, after the at least one lens optic of the plurality of lens optics of the lens is laser processed, the lens is determined to be focused relative to the imager when the image aligns with an image plane of the imager.

* * * * *